US006687552B1

(12) United States Patent
Edwards et al.

(10) Patent No.: US 6,687,552 B1
(45) Date of Patent: Feb. 3, 2004

(54) DATA INDICATOR

(75) Inventors: Geoffrey S. Edwards, England (GB); Michael C. Foster, England (GB)

(73) Assignee: Oxley Developments Company Limited, Cumbria (GB)

( * ) Notice: Subject to any disclaimer, the term of this patent is extended or adjusted under 35 U.S.C. 154(b) by 0 days.

(21) Appl. No.: 09/539,278

(22) Filed: Mar. 30, 2000

(30) Foreign Application Priority Data

Mar. 30, 1999 (GB) ............................................ 9907180

(51) Int. Cl.[7] ................................................ G05B 11/01

(52) U.S. Cl. ............................ 700/14; 700/15; 702/61; 702/176; 702/177; 702/178; 702/187

(58) Field of Search ............................ 700/14–15, 306; 116/200–201; 345/519–520; 340/309.04; 307/41; 702/61, 79, 176–178, 180, 187, 182–185; 968/605, 612

(56) References Cited

U.S. PATENT DOCUMENTS 3,735,081 A * 5/1973 Foerstner .................... 219/714
4,001,557 A * 1/1977 Stephenson .................. 700/14
4,184,347 A * 1/1980 Tobita et al. .............. 68/12.23
4,463,348 A * 7/1984 Sidebottom ................. 340/585
4,539,632 A * 9/1985 Hansen et al. ................ 700/14
4,613,939 A * 9/1986 Paine .......................... 701/35
4,672,232 A * 6/1987 Schoen ....................... 307/140
4,777,864 A * 10/1988 Siech et al. .................... 89/45
4,977,515 A * 12/1990 Rudden et al. ............. 700/296
5,018,148 A * 5/1991 Patel et al. ................... 714/22
5,322,033 A * 6/1994 Doan ......................... 116/308
5,396,048 A * 3/1995 King et al. ................. 219/494
5,644,491 A * 7/1997 Fiske et al. ................. 701/102
6,377,858 B1 * 4/2002 Koeppe ....................... 700/12

FOREIGN PATENT DOCUMENTS

FR 2680086 A1 * 2/1993 ........... A46B/15/00

* cited by examiner

*Primary Examiner*—Wilbert L. Starks, Jr.
*Assistant Examiner*—Crystal J. Barnes
(74) *Attorney, Agent, or Firm*—Christie, Parker & Hale, LLP

(57) ABSTRACT

A data indicator is disclosed which comprises a non-volatile memory (26), control circuitry (24) by which data can be read from and written to the memory, a timer (28) and/or an event detector (30), means such as a terminal (20) for connection to an electrical supply of a host apparatus and an interface (32) through which data can be exchanged with the memory (26). In use, the event detector (30) detects when the host apparatus is switched on and in dependence on the detector output the control circuitry (24) maintains a cumulative history of host apparatus activation which is stored on the memory (26). The data indicator can store other data relating to the host apparatus, e.g. a service interval, and can supply this in conjunction with the actuation history, making it conveniently possible e.g. to establish whether the host apparatus requires servicing. (FIG. 4).

30 Claims, 3 Drawing Sheets

DATA INDICATOR

BACKGROUND OF THE INVENTION

The present invention concerns a development to elapsed time indicators of the type used in conjunction with electrically operated equipment to log running time and also with event counters.

Non-volatile semiconductors can store data without an electrical input like a battery for many years and this attribute had led to the development of electronic identification systems (EID) which are effectively electronic bar codes.

Additionally, because non-volatile semiconductors can be programmed by providing a suitable electrical bias, the data can be changed and still remain nonvolatile after each change—the so-called electrically alterable read only memory (EAROM). This has enabled several applications, including the storage and indication of the running time of equipment (so-called elapsed time indicators) or the on equipment logging of data on maintenance/asset tracking.

SUMMARY OF THE INVENTION

An aim of the present invention is to provide an improved means of logging data concerning an item of equipment.

In accordance with the present invention, there is an elapsed time and data indicator comprising a non-volatile memory, control circuitry by which data can be read from and written to the memory, a timer, means for connection to the electrical supply of a host apparatus, and an interface through which data can be exchanged with the memory, such that in use the timer measures the duration of periods during which the host electrical supply is switched on and in dependence on the timer output the control circuitry maintains a cumulative record of elapsed host apparatus running time which is stored on the non-volatile memory, other data relating to the host apparatus being writable to the non-volatile memory so that the indicator can be used to record and, through the interface, supply elapsed host apparatus running time in conjunction with other data relating to the host apparatus.

In a broader aspect, the data indicator of the present invention comprises a non-volatile memory, control circuitry by which data can be read from and written to the memory, means for connection to the electrical supply of a host apparatus, a detector connected to the means for connection to the electrical supply of the host apparatus, and an interface through which data can be exchanged with the memory, such that in use the detector detects when the host electrical supply is switched on and in dependence on the detector output the control circuitry maintains a cumulative history of host apparatus activation which is stored on the non-volatile memory, other data relating to the host apparatus being writable to the non-volatile memory so that the indicator can be used to record and, through the interface, supply elapsed host apparatus activation data in conjunction with other data relating to the host apparatus.

By making available the running time or number of times the equipment has been used in conjunction with other data, the apparatus in accordance with the invention opens up a host of advantageous possibilities, especially with regard to logistics/asset management and reliability monitoring.

For instance, the data may include the timing of previous service(s) so that taking account of the total elapsed time recorded by the indicator an indication of whether a service is due, or of how much running time remains before the next service, may be provided. Relevant data such as the service interval could also be stored by the indicator.

The data storable on the indicator will typically include a host apparatus identifier. It may also include other logging data. This may comprise one or more of: maintenance data, tracking data, reliability data (fault data), modification level.

The indicator is preferably formed as a single unit comprising a housing containing the circuitry, means for mounting the housing to the host apparatus, terminations for connection of the circuitry to the host electrical supply and a contact or contacts connected to the interface and through which a connection can be releasably made to means for interrogating the indicator.

Such a unit may be retro-fittable to an existing apparatus. It need not necessarily have means for displaying the stored data. This can be more economically achieved using an additional device connected to the indicator through the contacts. For example, the means for interrogating the indicator may comprise a computer connectable to the indicator through a plug engageable with the contacts. The computer can be used to receive data from any number of indicators.

The circuitry of the indicator may be arranged to draw its power supply from the host apparatus via the means for connection to the host electrical supply. In this way, batteries or other maintenance requiring dedicated power source can be dispensed with.

It is particularly preferred that a separate device for receiving and displaying the stored data is additionally provided comprising a power supply, means for connection to the indicator such as to supply power and receive the data therefrom, and means for displaying received data. A battery is a suitable power supply. Such a device can be conveniently used to interrogate the indicator even when it is not receiving power from the host. It may be configured to clip onto the indicator for convenience. The means for data display may utilise a liquid crystal display.

BRIEF DESCRIPTION OF THE DRAWINGS

A specific embodiment of the present invention will now be described, by way of example only, with reference to the accompanying drawings, in which.

DETAILED DESCRIPTION OF THE INVENTION

Figure 1:
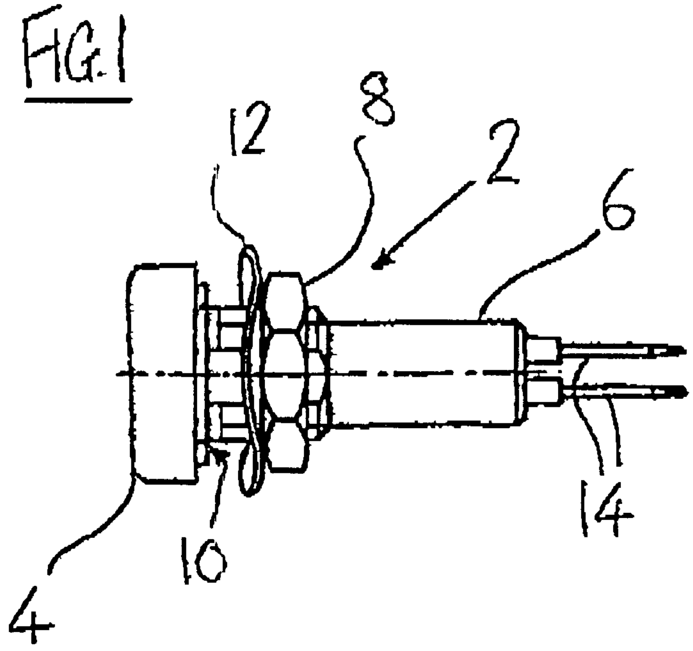
FIG. 1 is a view of a unit embodying the present invention along a radial direction.
Figure 2:
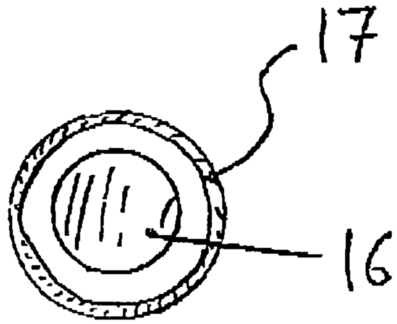
FIG. 2 is a view of one end of the unit along its axial direction.

FIGS. 1 and 2 illustrate a bolt-in module which can be secured to the equipment being monitored (this is important to maintain the integrity of the information stored by the unit). There is provided a hollow housing 2 containing the necessary circuitry and having an enlarged diameter head 4 leading to a cylindrical body 6 part which is externally threaded to receive a nut 8. Mounting of the unit is achieved by inserting the body of the unit into a suitable hole in a panel or similar of the equipment, suck that the head 4 remains accessible outside the equipment abutting the outer face of the panel and is drawn thereagainst by the nut which is tightened toward the panel's inner face. A sealing ring 10 can be provided to exclude moisture and a locking washer 12 resists any tendency for the nut to work loose.

At its end remote from the head, the unit has a pair of electrical terminations 14 for connection to the electrics of the associated apparatus.

The bead 4 has a pair of circular contacts 16, 17 formed one within the other on its end face as FIG. 2 illustrates and these provide the means for interfacing with the unit's electronic circuitry.

These contacts are, in one embodiment, addressed by a cup ended wand (not illustrated) which makes electrical contacts to the inner and outer contacts 16, 17 and through a cable to a reader/recorder unit which can subsequently download the data to a central computer.

Figure 3:
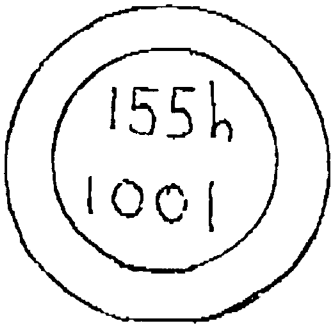
FIG. 3 illustrates in plan a reader for use with the illustrated unit.

Alternatively or additionally, a clip-on LCD display/reader may be provided with contacts to the inner and outer contacts to facilitate in situ visual reading of appropriate data—see FIG. 3. To allow a cold read, i.e. when the unit is not energised by the equipment, then a battery can be incorporated in the clip on LCD display/reader. In the illustrated embodiment, the reader shows both elapsed time and numeric data such as an identifying code.

Figure 4:
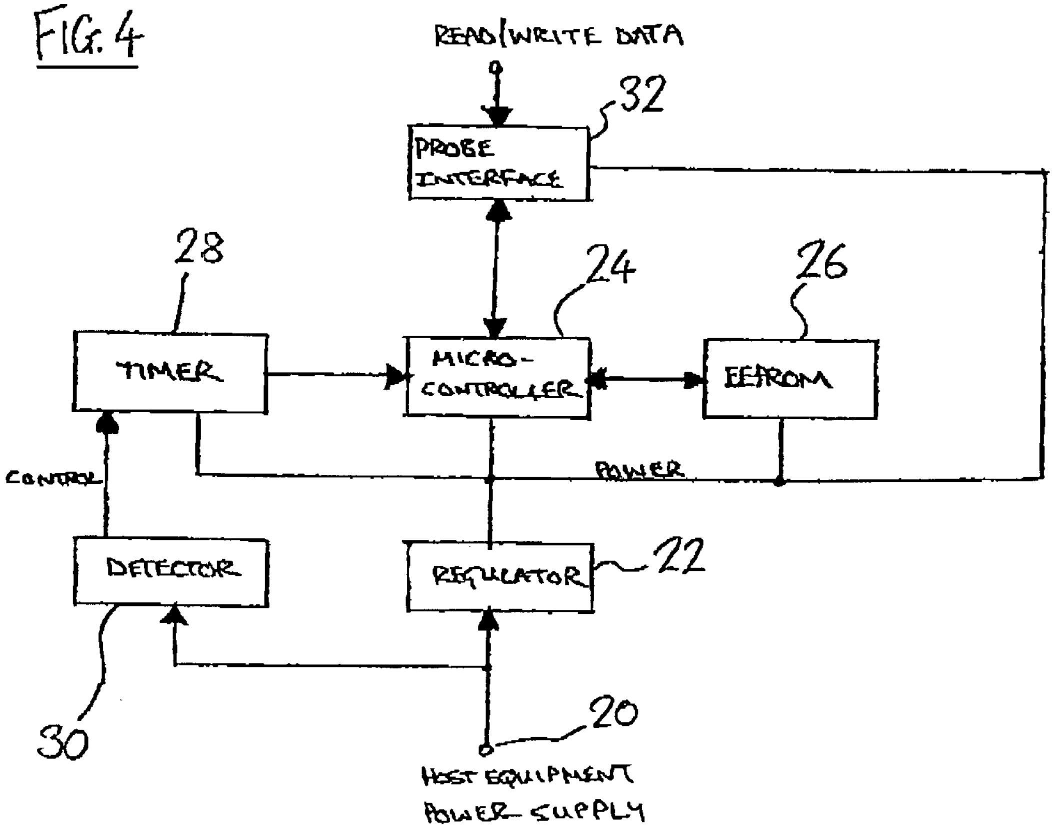
FIG. 4 is a block diagram of the electronic circuitry within the unit.

Looking now at the circuit block diagram forming FIG. 4, the connection seen at 20 in this drawing to the host equipment power supply is through the terminations 14. Power supply to various functional units of the circuit is provided by the host equipment through the connection 20 and a regulator 22.

A micro-controller 24 is provided and can read from and electrically write to non-volatile memory 26, formed according to the illustrated embodiment by an EEPROM. A timer 28 is provided which takes a control input from a detector 30 itself connected to the host power supply so that the timer runs only while the host supply is switched on. The timer output is led to the micro-controller 24 which thereby maintains an elapsed time counter, storing the relevant value in the memory 26 so that a cumulative total is maintained.

The micro-controller may additionally or alternatively maintain on the nonvolatile memory 26 a record of the total of the number of times the host apparatus has been switched on. In fact where this type of "event counter" is implemented, the timer 28 and the record of running time may in accordance with the invention be dispensed with.

Data can also be written to and read from the memory via the micro-controller and an interface 32 to which connections can be made using the contacts 16 seen in FIG. 2. Such data can include items such as an identifier characteristic of the apparatus to which the unit is attached, a modification level of the apparatus and maintenance data such as the timing of the last service or replacement of selected components).

Figure 5:
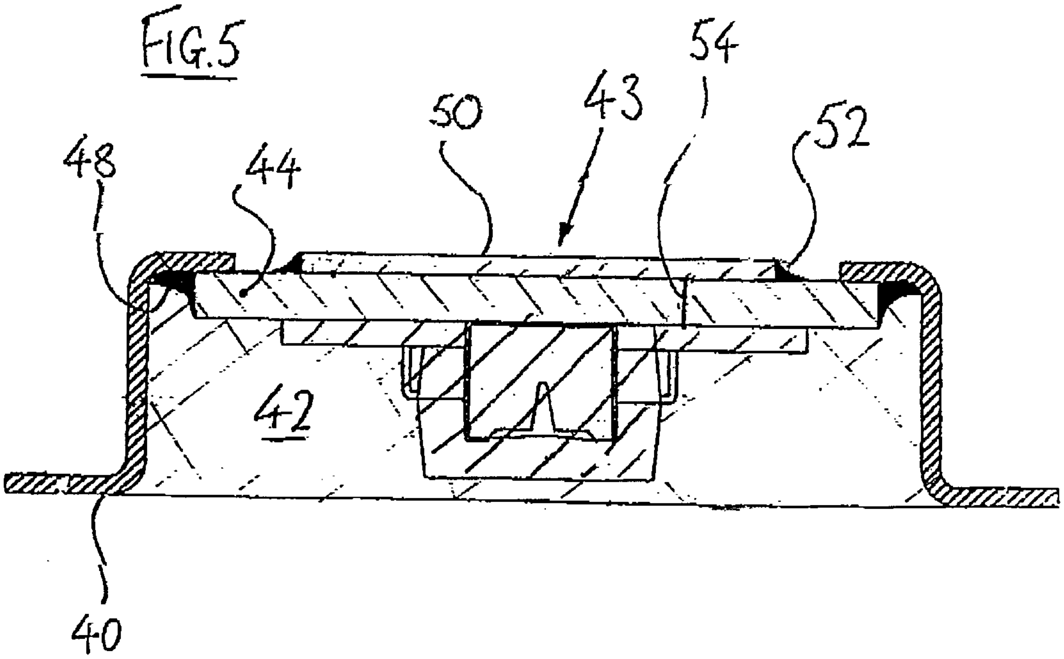
FIG. 5 is a cross section through a further unit embodying the present invention.

FIG. 5 illustrates a farther mode of physical construction of a unit embodying the present invention, comprising a brass casing 40 defining an internal space 42 containing the circuitry. The upper part of the casing is formed with an opening 43 immediately below which is secured a ceramic substrate 44 bearing the electronic circuitry on its underside. The physical connection of the substrate 44 to the casing 40 is through an epoxy joint 48 which is electrically conductive and in this way the 0 volt connection to the circuitry is formed through the casing 40. Another connection for signals and power is formed through a metal contact plate 50 secured to the upper face of the substrate 44 and exposed to the exterior through the opening 43 in the casing. Electrical connection between the circuitry and the contact plate is via epoxy joint 52 and a plated through hole connection 54 formed in the substrate.

We claim:

1. A data indicator formed as a single unit mountable upon a host apparatus and comprising a housing which comprises an enlarged head part and a body part, the body part being insertable into the host apparatus such that the head remains accessible from outside the host, the housing containing electronics, which comprise a non-volatile memory, control circuitry by which data can be read from and written to the memory, a timer, means for connection to an electrical supply of such host apparatus, an interface through which the data can be exchanged with the memory, and electrical terminations which are carried by the body part and so are connectable in use to electrics of the host apparatus, the interface comprising contacts used to exchange the data, said contacts are carried by the head and accessible from the exterior of such host apparatus so that a connection can be releasably made to the data indicator for exchange of the data, wherein in use the timer measures the duration of periods during which such host electrical supply is switched on and in dependence on the timer output the control circuitry maintains a cumulative record of elapsed host apparatus running time which is stored on the non-volatile memory, other data relating to such host apparatus being writable to the non-volatile memory so that the indicator can be used to record and, through the interface, supply elapsed host apparatus running time in conjunction with said other data relating to such host apparatus.

2. A data indication system comprising a data indicator as claimed in claim 1 and a separate device for receiving and displaying the stored data comprising a power supply, means for connection to the indicator in order to supply power and receive the data from the separate device, and means for displaying the received data.

3. A data indicator as claimed in claim 1 which stores a host apparatus identifier.

4. A data indicator as claimed in claim 1 which stores host apparatus logging data.

5. A data indicator as claimed in claim 4 wherein the logging data comprises one or more of: maintenance data, tracking data, reliability data and modification level.

6. A data indicator as claimed in claim 1 which stores a host apparatus service interval.

7. A data indicator as claimed in claim 1 arranged to draw power from the host apparatus via means for connection to the host electrical supply.

8. A data indicator formed as a single unit mountable upon a host apparatus and comprising a housing which comprises an enlarged head part and a body part, the body part being insertable into the host apparatus such that the head remains accessible from outside the host, the housing containing electronics which comprise a non-volatile memory, control circuitry by which data can be read from and written to the memory, means for connection to an electrical supply of such host apparatus, a detector connected to the means for connection to the electrical supply of the host apparatus, an interface through which the data can be exchanged with the memory, and electrical terminations which are carried by the body part and so are connectable in use to electrics of the host apparatus, the interface comprising contacts used to exchange the data, said contacts are carried by the head and accessible from the exterior of such host apparatus so that a connection can be releasably made to the data indicator for exchange of the data, wherein in use the detector detects when the host electrical supply is switched on and in dependence on the detector output the control circuitry maintains a cumulative history of host apparatus activation which is stored on the non-volatile memory, other data relating to the host apparatus being writable to the non-volatile memory so that the indicator can be used to record and, through the interface, supply elapsed host apparatus activation data in conjunction with said other data relating to such host apparatus.

9. A data indicator as claimed in claim 8 arranged to draw power from the host apparatus.

10. A data indicator as claimed in claim 8 wherein the control circuitry maintains on the non-volatile memory a host apparatus activation history comprising the number of times the host apparatus has been switched on.

11. A data indicator as claimed in claim 8 wherein the detector output is provided to a timer which is connected to the control circuitry, such that the control circuitry maintains on the non-volatile memory a host activation history comprising elapsed running time of the host apparatus.

12. A data indicator as claimed in claim 8 which stores a host apparatus service interval.

13. A data indicator comprising a non-volatile memory, control circuitry for writing data to and reading the data from the memory, a timer, electrical terminations for connection of an electrical supply of a host apparatus to the data indicator, the data indicator being capable of drawing its power supply through the terminations from such host apparatus, and an interface through which the data is exchanged with the memory, wherein in use the timer measures the duration of periods during which such host electrical supply is switched on and in dependence on an output of the timer the control circuitry maintains in the non-volatile memory a cumulative first record of elapsed host apparatus running time, other data in the non-volatile memory relating to the host apparatus being written to the non-volatile memory so that the data indicator thereby provides a second record of the other data, the data indicator supplies through the interface, to means for interrogating, the elapsed running time of such host apparatus from the first record in conjunction with the other data relating to such host apparatus from the second record, wherein the data indicator is formed as a single unit comprising a housing containing the circuitry, means for mounting the housing to such host apparatus, and at least one releasable contact connected to the interface and through which connection is made between the data indicator and such means for interrogating, and wherein the housing comprises at opposite ends an enlarged head at which the releasable contact is located and at least two electrical conductors comprising the terminations.

14. A data indication system comprising a data indicator comprising a non-volatile memory, control circuitry for writing data to and reading the data from the memory, a timer, and at least one contact through which the data is exchanged with the memory, said at least one contact being exposed at an exterior surface of the data indicator so as to be contactable by means for interrogating, wherein in use the timer measures the duration of periods during which an electrical supply of a host apparatus is switched on and in dependence on an output of the timer the control circuitry maintains in the non-volatile memory a cumulative first record of elapsed host apparatus running time, other data in the non-volatile memory relating to the host apparatus being written to the non-volatile memory so that the data indicator thereby provides a second record of the other data, the data indicator supplies through said at least one contact, to said means for interrogating, the elapsed running time of such host apparatus from the first record in conjunction with the other data relating to such host apparatus from the second record; and a separate device for receiving and displaying the stored data comprising a power supply, means for connection to the indicator such as to supply power and receive the data therefrom, and means for displaying received data.

15. A data indicator comprising a non-volatile memory, control circuitry for writing data to and reading the data from the memory, a timer, electrical terminations for connection of an electrical supply of a host apparatus to the data indicator, the data indicator being capable of drawing its power supply through the terminations from such host apparatus, and an interface through which the data is exchanged with the memory, wherein in use the timer measures the duration of periods during which such host electrical supply is switched on and in dependence on an output of the timer the control circuitry maintains in the non-volatile memory a cumulative first record of elapsed host apparatus running time, other data in the non-volatile memory relating to the host apparatus being written to the non-volatile memory so that the data indicator thereby provides a second record of the other data, the data indicator supplies through the interface, to means for interrogating, the elapsed running time of such host apparatus from the first record in conjunction with the other data relating to such host apparatus from the second record.

16. A data indicator as claimed in claim 15 formed as a single unit comprising a housing containing the circuitry, means for mounting the housing to such host apparatus, and at least one releasable contact connected to the interface and through which connection is made between the data indicator and such means for interrogating.

17. A data indicator as claimed in claim 15 which stores a host apparatus service interval.

18. The data indicator as claimed in claim 15, further comprising a detector connected to the terminations for connection to the electrical supply of the host apparatus, wherein in use the detector detects when the host electrical supply is switched on and in dependence on the detector output the control circuitry maintains a cumulative history of host apparatus activation, which is stored on the non-volatile memory, so that the indicator can be used to record and, through the interface, supply said cumulative history of host apparatus activation.

19. A data indicator comprising a non-volatile memory, control circuitry for writing data to and reading the data from the memory, a timer, electrical terminations for connection of an electrical supply of a host apparatus to the data indicator, the data indicator being capable of drawing its power supply through the terminations from such host apparatus, and an interface through which the data is exchanged with the memory, wherein in use the timer measures the duration of periods during which such host electrical supply is switched on and in dependence on an output of the timer the control circuitry maintains in the non-volatile memory a cumulative first record of elapsed host apparatus running time, other data in the non-volatile memory relating to the host apparatus being written to the non-volatile memory so that the data indicator thereby provides a second record of the other data, the data indicator supplies through the interface, to means for interrogating, the elapsed running time of such host apparatus from the first record in conjunction with the other data relating to such host apparatus from the second record, wherein the data indicator stores a host apparatus identifier.

20. A data indicator comprising a non-volatile memory, control circuitry for writing data to and reading the data from the memory, a timer, electrical terminations for connection of an electrical supply of a host apparatus to the data indicator, the data indicator being capable of drawing its power supply through the terminations from such host apparatus, and an interface through which the data is exchanged with the memory, wherein in use the timer measures the duration of periods during which such host electrical supply is switched on and in dependence on an output of the timer the control circuitry maintains in the non-volatile memory a cumulative first record of elapsed host apparatus running time, other data in the non-volatile memory relating to the host apparatus being written to the non-volatile memory so that the data indicator thereby provides a second record of the other data, the data indicator supplies through the interface, to means for interrogating, the elapsed running time of such host apparatus from the first record in conjunction with the other data relating to such host apparatus from the second record, wherein the data indicator stores host apparatus logging data.

21. A data indicator as claimed in claim 20 wherein the logging data comprises one or more of: maintenance data, tracking data, reliability data and modification level.

22. A data indicator comprising a non-volatile memory, control circuitry for writing data to and reading the data from the memory, a timer, and at least one contact through which the data is exchanged with the memory, said at least one contact being exposed at an exterior surface of the data indicator so as to be contactable by means for interrogating, wherein in use the timer measures the duration of periods during which an electrical supply of a host apparatus is switched on and in dependence on an output of the timer the control circuitry maintains in the non-volatile memory a cumulative first record of elapsed host apparatus running time, other data in the non-volatile memory relating to the host apparatus being written to the non-volatile memory so that the data indicator thereby provides a second record of the other data, the data indicator supplies through said at least one contact, to said means for interrogating, the elapsed running time of such host apparatus from the first record in conjunction with the other data relating to such host apparatus from the second record, wherein the data indicator is formed as a single unit comprising a housing containing the circuitry, means for mounting the housing to such host apparatus, and electrical terminations for connection of the electrical supply of such host apparatus to the data indicator, the data indicator being capable of drawing its power supply through the terminations from such host apparatus, and wherein the housing comprises at opposite ends an enlarged head at which the releasable contact is located and at least two electrical conductors comprising the terminations.

23. A data indication system comprising a data indicator comprising a non-volatile memory, control circuitry for writing data to and reading the data from the memory, a timer, electrical terminations for connection of an electrical supply of a host apparatus to the data indicator, the data indicator being capable of drawing its power supply through the terminations from such host apparatus, and an interface through which the data is exchanged with the memory, wherein in use the timer measures the duration of periods during which such host electrical supply is switched on and in dependence on an output of the timer the control circuitry maintains in the non-volatile memory a cumulative first record of elapsed host apparatus running time, other data in the non-volatile memory relating to the host apparatus being written to the non-volatile memory so that the data indicator thereby provides a second record of the other data, the data indicator supplies through the interface, to means for interrogating, the elapsed running time of such host apparatus from the first record in conjunction with the other data relating to such host apparatus from the second record; and a separate device for receiving and displaying the stored data comprising a power supply, means for connection to the indicator such as to supply power and receive the data therefrom, and means for displaying received data.

24. A data indicator comprising a non-volatile memory, control circuitry for writing data to and reading the data from the memory, a timer, and at least one contact through which the data is exchanged with the memory, said at least one contact being exposed at an exterior surface of the data indicator so as to be contactable by means for interrogating, wherein in use the timer measures the duration of periods during which an electrical supply of a host apparatus is switched on and in dependence on an output of the timer the control circuitry maintains in the non-volatile memory a cumulative first record of elapsed host apparatus running time, other data in the non-volatile memory relating to the host apparatus being written to the non-volatile memory so that the data indicator thereby provides a second record of the other data, the data indicator supplies through said at least one contact, to said means for interrogating, the elapsed running time of such host apparatus from the first record in conjunction with the other data relating to such host apparatus from the second record.

25. A data indicator as claimed in claim 24 formed as a single unit comprising a housing containing the circuitry, means for mounting the housing to such host apparatus, and electrical terminations for connection of the electrical supply of such host apparatus to the data indicator, the data indicator being capable of drawing its power supply through the terminations from such host apparatus.

26. A data indicator as claimed in claim 24 which stores a host apparatus service interval.

27. The data indicator as claimed in claim 24, further comprising a detector connected to the terminations for connection to the electrical supply of the host apparatus, wherein in use the detector detects when the host electrical supply is switched on and in dependence on the detector output the control circuitry maintains a cumulative history of host apparatus activation, which is stored on the non-volatile memory, so that the indicator can be used to record and, through said at least one contact, supply said cumulative history of host apparatus activation.

28. A data indicator comprising a non-volatile memory, control circuitry for writing data to and reading the data from the memory, a timer, and at least one contact through which the data is exchanged with the memory, said at least one contact being exposed at an exterior surface of the data indicator so as to be contactable by means for interrogating, wherein in use the timer measures the duration of periods during which an electrical supply of a host apparatus is switched on and in dependence on an output of the timer the control circuitry maintains in the non-volatile memory a cumulative first record of elapsed host apparatus running time, other data in the non-volatile memory relating to the host apparatus being written to the non-volatile memory so that the data indicator thereby provides a second record of the other data, the data indicator supplies through said at least one contact, to said means for interrogating, the elapsed running time of such host apparatus from the first record in conjunction with the other data relating to such host apparatus from the second record, wherein the data indicator stores a host apparatus identifier.

29. A data indicator comprising a non-volatile memory, control circuitry for writing data to and reading the data from the memory, a timer, and at least one contact through which the data is exchanged with the memory, said at least one contact being exposed at an exterior surface of the data indicator so as to be contactable by means for interrogating, wherein in use the timer measures the duration of periods during which an electrical supply of a host apparatus is switched on and in dependence on an output of the timer the control circuitry maintains in the non-volatile memory a cumulative first record of elapsed host apparatus running time, other data in the non-volatile memory relating to the host apparatus being written to the non-volatile memory so that the data indicator thereby provides a second record of the other data, the data indicator supplies through said at least one contact, to said means for interrogating, the elapsed running time of such host apparatus from the first record in conjunction with the other data relating to such host apparatus from the second record, wherein the data indicator stores host apparatus logging data.

30. A data indicator as claimed in claim 29 wherein the logging data comprises one or more of: maintenance data, tracking data, reliability data and modification level.

* * * * *